G. M. EATON.
LOCOMOTIVE.
APPLICATION FILED NOV. 3, 1916.
1,268,942.
Patented June 11, 1918.
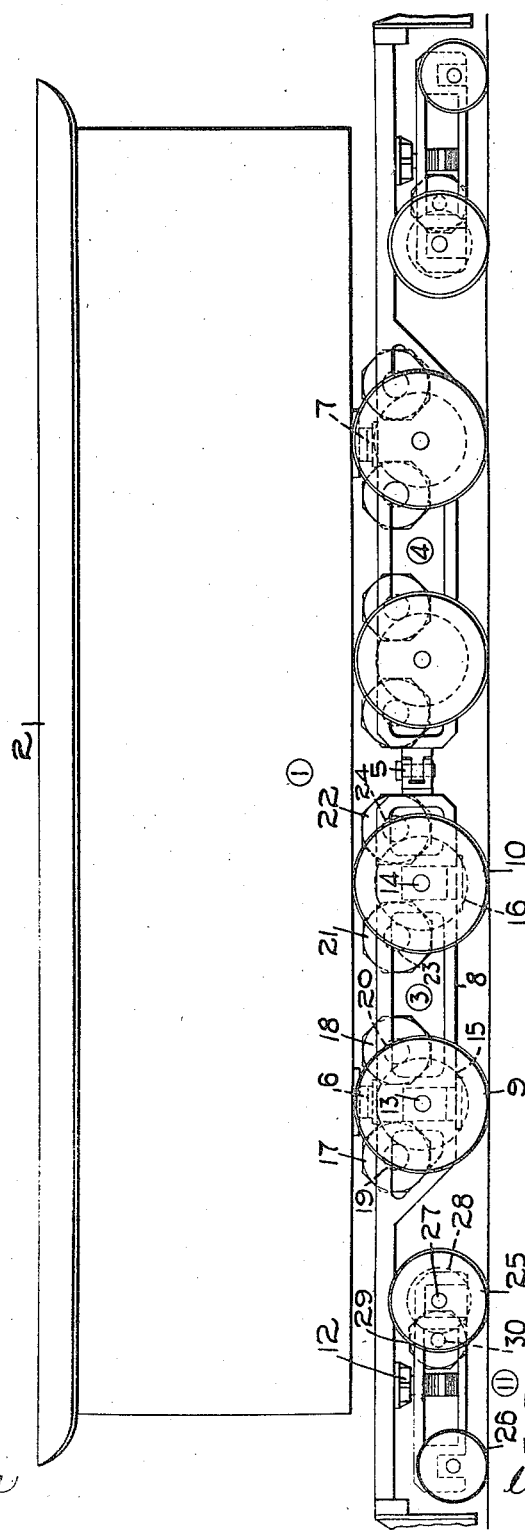
WITNESSES:
INVENTOR
George M. Eaton.
BY
ATTORNEY

UNITED STATES PATENT OFFICE.

GEORGE M. EATON, OF PITTSBURGH, PENNSYLVANIA, ASSIGNOR TO WESTINGHOUSE ELECTRIC & MANUFACTURING COMPANY, A CORPORATION OF PENNSYLVANIA.

LOCOMOTIVE.

1,268,942.    Specification of Letters Patent.    Patented June 11, 1918.

Application filed November 3, 1916. Serial No. 129,280.

*To all whom it may concern:*

Be it known that I, GEORGE M. EATON, a citizen of the United States, and a resident of Pittsburgh, in the county of Allegheny and State of Pennsylvania, have invented a new and useful Improvement in Locomotives, of which the following is a specification.

My invention relates to electrically-propelled vehicles and particularly to electric locomotives.

One object of my invention is to provide a locomotive of greatly increased capacity, as compared with locomotives of the same type now in service, and one that shall have good steering and tracking characteristics when operating at relatively high speeds.

Another object of my invention is to provide a locomotive of the above-indicated character which shall be provided with a guiding truck having two pairs of wheels of different diameters and a propelling motor mounted on the axle of one pair of the guiding wheels.

More specifically, my invention embodies a locomotive provided with a cab and two articulated running gears pivotally connected thereto. Each running gear embodies two pairs of main driving wheels of relatively large diameter having two motors directly connected thereto, and a pivotal guiding truck having two pairs of wheels. One pair of wheels on the guiding truck is of a medium diameter and is provided with a driving motor, and the second pair of wheels on the guiding truck is idle and of relatively small diameter.

The single figure of the accompanying drawing is a side elevational view of a locomotive constructed in accordance with my invention.

Referring to the accompanying drawing, a locomotive 1 embodies a cab 2 and two running gears 3 and 4 which are connected together by means of an articulated connection 5 and are connected to the cab 2 by means of pivotal connections 6 and 7. The running gear units 3 and 4 are similar in construction and each embodies a frame 8 having two pairs of main driving wheels 9 and 10 mounted therein and a pivotal guiding truck 11 connected thereto by means of a pivotal connection 12. The main driving wheels 9 and 10 are provided with axles 13 and 14 which have gear wheels 15 and 16 mounted thereon.

Two motors 17 and 18 are mounted on the frame 8 adjacent to the pair of driving wheels 9 and are provided with pinions 19 and 20 that mesh with the gear wheel 15 which is mounted on the driving axle 13. Two motors 21 and 22 are mounted adjacent to the main driving wheels 10 and are provided with pinions 23 and 24 which are adapted to engage the gear wheel 16 mounted on the driving shaft 14.

The guiding truck 11 embodies a pair of rear wheels 25 of medium diameter and a forward pair of wheels 26 of relatively small diameter. The rear pair of wheels 25 is provided with a driving axle 27 on which is mounted a gear wheel 28. Between the pairs of wheels 25 and 26 is mounted a motor 29 having a pinion 30 which meshes with the gear wheel 28 on the axle 27.

Variations in the structure and arrangement and location of parts may be made without departing from the spirit and scope of my invention, and such modifications are intended to be covered by the appended claims.

I claim as my invention;

1. In a locomotive, the combination with a cab, of two running gears pivotally associated therewith, each of said running gears comprising two pairs of main driving wheels mounted in a rigid wheel base and a secondary rigid wheel base pivotally joined to the frame of the running gear.

2. In a locomotive, the combination with a cab, of two running gears pivotally associated therewith, each of said running gears comprising two pairs of main driving wheels in a rigid wheel base and a four-wheel pivotal guiding truck, and means for directly transmitting power to one pair of the wheels on said guiding truck.

3. In a locomotive, a running gear comprising a plurality of pairs of main driving wheels, two motors directly connected to each pair of said main driving wheels, a four-wheel pivotal truck, and one motor directly connected to one pair of wheels on said pivotal truck.

4. In a locomotive, a running gear comprising two pairs of main driving wheels, two motors directly connected to each pair of main driving wheels, a pivotal guiding truck having two pairs of wheels of different diameters, and a motor directly connected to one pair of wheels of said guiding truck.

5. In a locomotive, the combination with a cab, of a plurality of running gears pivotally connected to said cab, each of said running gears comprising a four-wheel pivotal guiding truck and a plurality of pairs of main driving wheels, two motors associated with each of said pairs of main driving wheels and one motor associated with one axle of said guiding truck.

6. In a locomotive, the combination with a cab, of two running gears pivotally connected to said cab, each of said running gears comprising a four-wheel pivotal guiding truck and two pairs of main driving wheels, the pair of rear wheels on said guiding truck having a larger diameter than the forward wheels of the guiding truck, and a motor directly connected to the rear axle of said guiding truck.

7. In a locomotive, the combination with a cab, of two running gears pivotally connected to said cab, each of said running gears comprising two pairs of main driving wheels and a pivotal guiding truck, said pivotal truck embodying two pairs of wheels having different diameters.

8. In a locomotive, the combination with a cab, of two running gears pivotally connected to said cab, each of said running gears comprising two pairs of main driving wheels in a rigid wheel base and a pivotal guiding truck having two pairs of wheels of different diameters, and means for directly applying power to one pair of the wheels on said guiding truck and to the two pairs of main driving wheels.

9. In an electric locomotive, a running-gear unit comprising a plurality of pairs of driving wheels of relatively large diameter, a plurality of electric motors operatively connected to each pair of said driving wheels, driving wheels of smaller diameter than the aforesaid wheels, and electric propelling means operatively connected to the smaller driving wheels.

10. In a locomotive, a running gear comprising a plurality of pairs of driving wheels of relatively large diameter, each pair of said driving wheels having two motors directly connected thereto, one pair of driving wheels of medium diameter having one motor directly connected thereto and one pair of idle wheels of small diameter.

11. In an electric locomotive, a running-gear unit comprising a plurality of pairs of driving wheels of relatively large diameter, a pair of electric driving motors operatively connected to each pair of said driving wheels, a pair of driving wheels of smaller diameter than the aforesaid wheels, and a single electric driving motor operatively connected to the smaller driving wheels.

12. In an electric locomotive, a running gear comprising a plurality of pairs of driving wheels of relatively large diameter, a pair of electric driving motors operatively connected to each pair of said wheels, a plurality of pairs of driving wheels of smaller diameter than the aforesaid wheels, and a single electric driving motor operatively connected to each pair of the smaller driving wheels.

In testimony whereof, I have hereunto subscribed my name this 28th day of Oct., 1916.

GEORGE M. EATON.